(12) United States Patent
O'Dell

(10) Patent No.: US 8,331,056 B2
(45) Date of Patent: Dec. 11, 2012

(54) SPIN STAND COMPRISING A DUAL DISK CLAMP

(75) Inventor: Thomas A O'Dell, Sunnyvale, CA (US)

(73) Assignee: WD Media, Inc., San Jose, CA (US)

( * ) Notice: Subject to any disclaimer, the term of this patent is extended or adjusted under 35 U.S.C. 154(b) by 129 days.

(21) Appl. No.: 12/718,910

(22) Filed: Mar. 5, 2010

(65) Prior Publication Data

US 2011/0219389 A1   Sep. 8, 2011

(51) Int. Cl.
G11B 17/038 (2006.01)
(52) U.S. Cl. .................................... 360/98.08
(58) Field of Classification Search ............... 360/98.08, 360/99.12; 720/604
See application file for complete search history.

(56) References Cited

U.S. PATENT DOCUMENTS

| | | |
|---|---|---|
| 4,627,288 A | 12/1986 | Guzik et al. |
| 4,755,981 A | 7/1988 | Ekhoff |
| 4,945,432 A * | 7/1990 | Matsudaira et al. ....... 360/98.02 |
| 5,012,363 A | 4/1991 | Mine et al. |
| 5,048,005 A | 9/1991 | Ekhoff |
| 5,056,082 A | 10/1991 | Ekhoff |
| 5,243,481 A | 9/1993 | Dunckley et al. |
| 5,249,090 A | 9/1993 | Fehse |
| 5,367,418 A * | 11/1994 | Chessman et al. ......... 360/99.12 |
| 5,485,328 A | 1/1996 | Radwan et al. |
| 5,542,685 A | 8/1996 | Allen et al. |
| 5,644,564 A | 7/1997 | Peters |
| 5,894,374 A | 4/1999 | Moraru |
| 5,912,784 A | 6/1999 | Bronshvatch et al. |
| 5,917,677 A | 6/1999 | Moir et al. |
| 6,130,801 A | 10/2000 | Cheng et al. |
| 6,229,664 B1 | 5/2001 | Albrecht et al. |
| 6,304,407 B1 | 10/2001 | Baker et al. |
| 6,373,243 B1 | 4/2002 | Takano et al. |
| 6,462,902 B1 * | 10/2002 | Luo et al. ................... 360/99.12 |
| 6,538,838 B1 | 3/2003 | Sacks et al. |
| 6,578,257 B1 | 6/2003 | Wang |
| 6,600,628 B2 | 7/2003 | Kilmer |
| 6,683,744 B2 | 1/2004 | Takano et al. |
| 6,696,831 B2 | 2/2004 | Nozu |
| 6,738,205 B1 | 5/2004 | Moran et al. |
| 6,798,614 B2 | 9/2004 | Buske et al. |
| 6,836,461 B2 | 12/2004 | Baum et al. |
| 6,947,244 B2 | 9/2005 | Kawaguchi et al. |
| 6,954,330 B2 | 10/2005 | Yeom |
| 6,965,489 B1 | 11/2005 | Lee et al. |
| 7,131,346 B1 | 11/2006 | Buttar et al. |
| 7,154,699 B2 | 12/2006 | Subrahamanyan et al. |
| 7,158,330 B2 | 1/2007 | Morris et al. |
| 7,206,157 B2 | 4/2007 | Ehrlich |
| 7,275,302 B2 | 10/2007 | Ng |
| 7,333,286 B2 | 2/2008 | Jung et al. |
| 7,499,244 B2 | 3/2009 | Oh et al. |
| 8,218,260 B2 | 7/2012 | Iamratanakul et al. |
| 2003/0099050 A1 | 5/2003 | Kitagawa |
| 2003/0103292 A1 * | 6/2003 | Yeom ......................... 360/99.12 |
| 2007/0081268 A1 | 4/2007 | Jung et al. |
| 2008/0002279 A1 | 1/2008 | Kouhara et al. |
| 2008/0062563 A1 | 3/2008 | Pettman et al. |
| 2008/0062855 A1 | 3/2008 | Warn et al. |

* cited by examiner

Primary Examiner — Craig A. Renner

(57) ABSTRACT

A spin stand is disclosed comprising a spindle motor having a rotor. A first disk clamp is operable to clamp a first disk to the rotor, and a second disk clamp is operable to clamp a second disk to the rotor. An actuator is operable to clamp the second disk clamp in order to clamp the second disk to the rotor after the first disk has been clamped to the rotor.

10 Claims, 7 Drawing Sheets

SPIN STAND COMPRISING A DUAL DISK CLAMP

BACKGROUND

A spin stand may be employed in the testing and/or manufacture of disk drives. For example, a spin stand may be used to certify components of a disk drive (e.g., test and evaluate media and heads), as well as calibrate optimal parameter settings (e.g., calibrate optimal write current for a given head/media combination). A spin stand may also be employed in a media writer wherein a number of disks are servo written, and then one or more of the servo written disks installed into a production disk drive.

A spin stand typically comprises a spindle motor for rotating a spindle shaft about a central axis. A disk chuck is coupled to the spindle shaft, wherein one or more disks are clamped to the disk chuck. U.S. Pat. No. 6,954,330 discloses a servo writer employing a releasable disk clamp that is actuated in order to clamp/unclamp a plurality of disks to/from a disk chuck. U.S. Pat. No. 7,158,330 discloses to clamp a reference disk to a disk chuck together with a plurality of blank disks, wherein the reference disk is followed while servo writing the blank disks. Both of these prior art designs have deficiencies addressed by the embodiments of the present invention.

DETAILED DESCRIPTION OF EMBODIMENTS OF THE INVENTION

Figure 1:
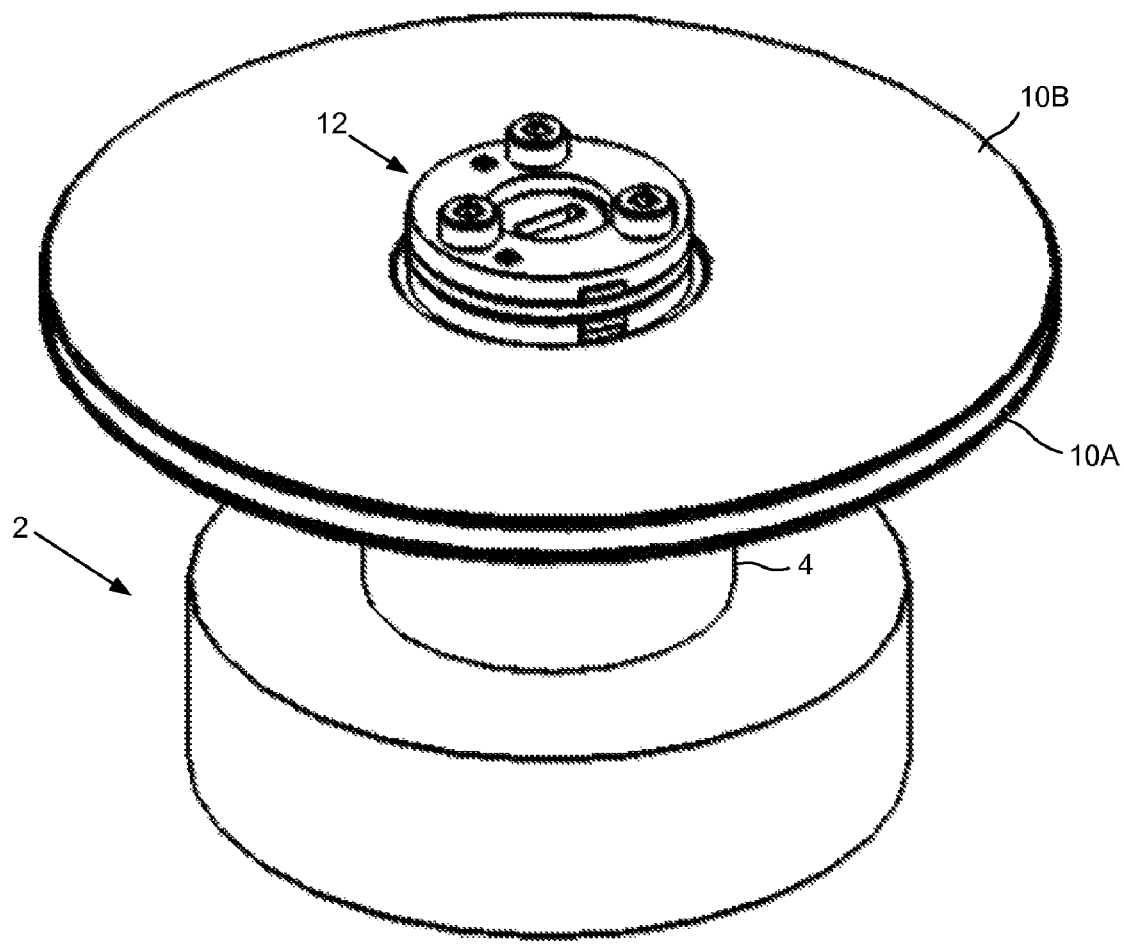
FIG. 1 shows a spin stand according to an embodiment of the present invention comprising a first (bottom) disk that remains clamped to the rotor of a spindle motor using a first disk clamp while clamping/unclamping a second (top) disk using a second disk clamp.
Figure 2:
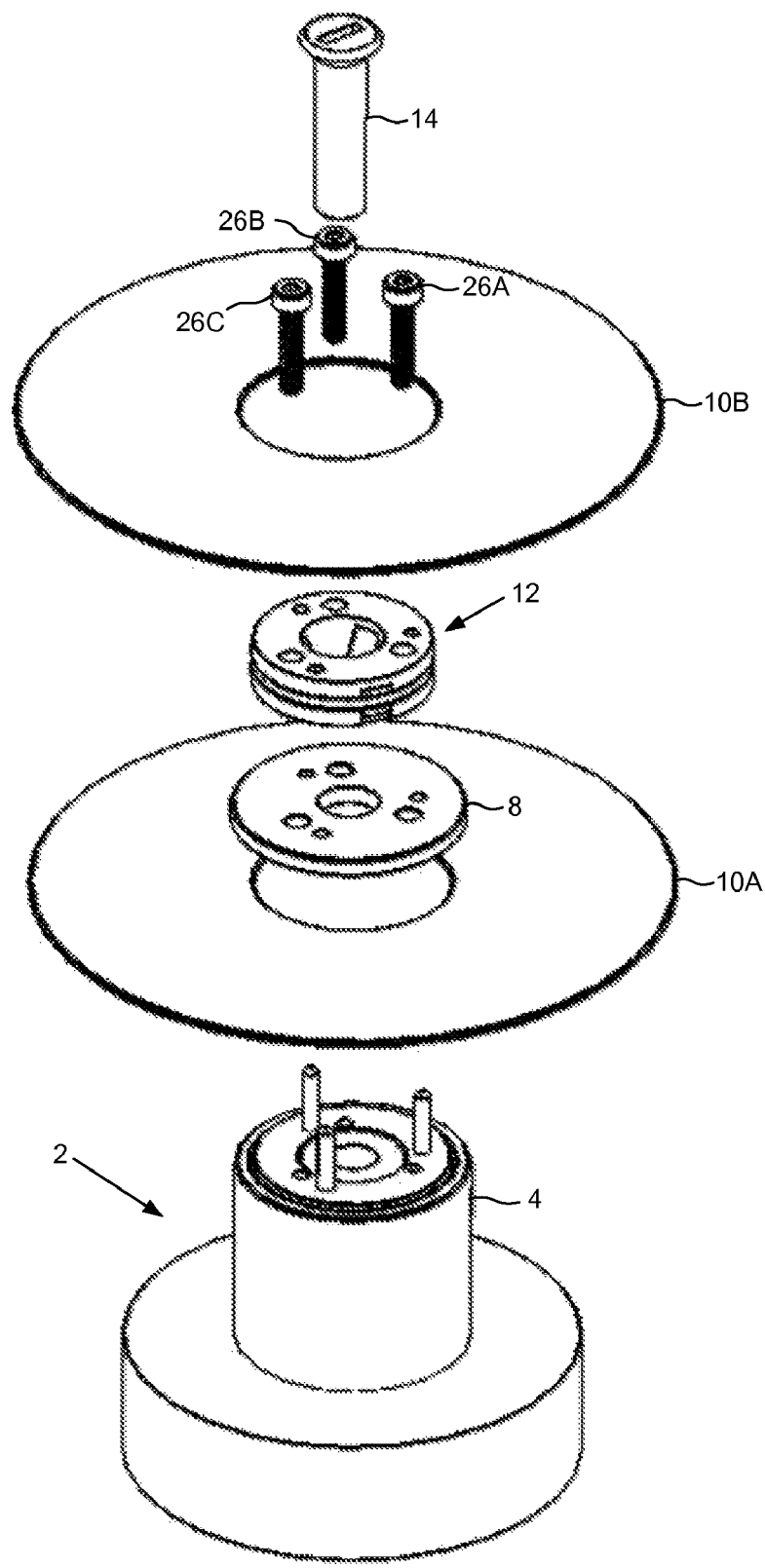
FIG. 2 shows an exploded view of the spin stand according to an embodiment of the present invention wherein a disk spacer clamps the first disk to the rotor of the spindle motor.

FIGS. 1 and 2 show a spin stand according to an embodiment of the present invention comprising a spindle motor 2 having a rotor 4. A first disk clamp 8 is operable to clamp a first disk 10A to the rotor 4, and a second disk clamp 12 is operable to clamp a second disk 10B to the rotor 4. An actuator 14 is operable to clamp the second disk clamp 12 in order to clamp the second disk 10B to the rotor 4 after the first disk 10A has been clamped to the rotor 4.

The spin stand of FIG. 1 may be employed in any suitable application, such as when testing various components (e.g., heads and/or disks), calibrating operating parameters (e.g., write current), certifying components as acceptable and/or binning components based on quality, servo writing the top disk with servo data (full servo write or partial servo write using seed tracks), etc. The spin stand comprises any suitable actuator (e.g., a voice coil motor) for actuating a head over one or both surfaces of each disk. Each head may comprise a read element and a write element, and in one embodiment, a head actuated over the first (bottom) disk 10A may comprise only a read element. The actuator for positioning the heads over the disk as well as the heads are conventional components not shown in the figures so as not to obscure the embodiments of the present invention.

Figure 3:
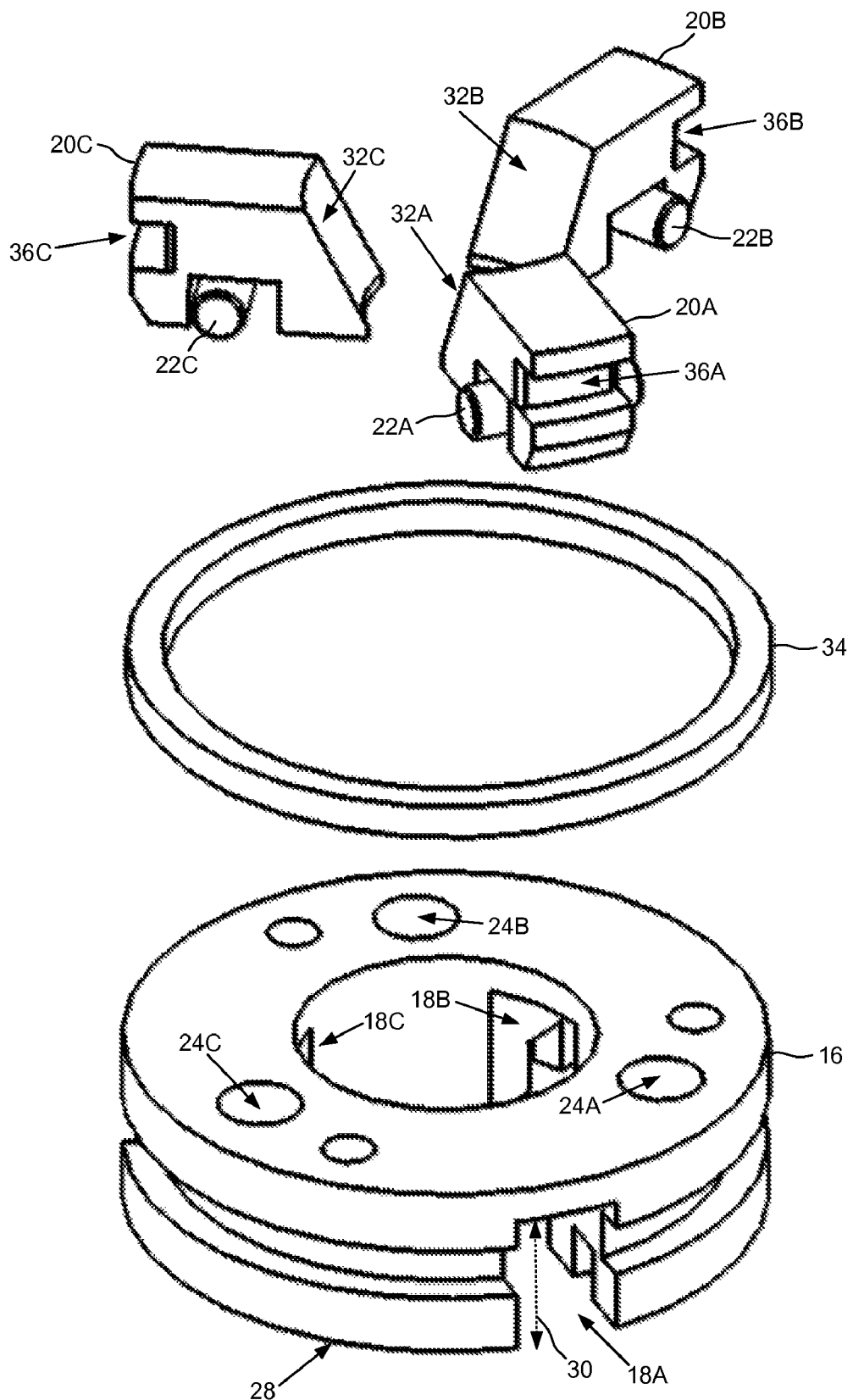
FIG. 3 shows details of the second disk clamp for clamping the second disk to the rotor, including fingers actuated outward to clamp the disk and then retracted to unclamp the disk.

FIG. 3 is an exploded view showing details of the second disk clamp 12 including a housing 16 having a plurality of chambers 18A-18C and a finger 20A-20C within each chamber 18A-18C. Each finger 20A-20C slides about a dowel 22A-22C in order to extend outward until the fingers 20A-20C engage an inner edge of the second disk 10B in order to clamp the second disk 10B to the rotor 4. The dowels 22A-22C retain each finger 20A-20C within the housing 16 when the second disk clamp 12 is installed and removed. A plurality of screws 26A-26C (FIG. 2) are inserted through respective holes 24A-24C in the housing 16 as well as through the spacer 8 and screwed into threaded holes bored into the rotor 4. The screws 26A-26C compress the bottom surface 28 of the housing 16 onto the top surface of the spacer 8 thereby providing a clamping force on the spacer 8 that clamps the first disk 10A to the rotor 4. A height 30 of the chambers 18A-18C ensures the clamping force of the screws 26A-26B is not transferred to the fingers 20A-20C, thereby allowing the fingers 20A-20C to move within the chambers 18A-18C. Each finger 20A-20C comprises a ramped surface 32A-32C that interacts with the head of the piston 14 shown in FIG. 2. The head of the piston 14 comprises a cone shape such that when the piston 14 is actuated vertically downward to clamp the second disk 10B, the head of the piston 14 presses on the ramped surfaces 32A-32C thereby extending the fingers 20A-20C outward until the fingers 20A-20C engage an inner edge of the second disk 10B. In the embodiment of FIG. 3, a circular elastic band 34 is wrapped around the fingers 20A-20C to provide a biasing force for biasing the fingers 20A-20C away from the inner edge of the second disk 10B. As shown in FIG. 3, each finger 20A-20C may comprise a suitable slot 36A-36C for receiving the circular elastic band 34. To unclamp the second disk 10B, the piston 14 is moved vertically upward allowing the circular elastic band 34 to retract the fingers 20A-20C. When the second disk 10B is unclamped, the first disk 10A remains clamped because the screws continue to apply the clamping force to the spacer 8 through the housing 16.

Figure 4:
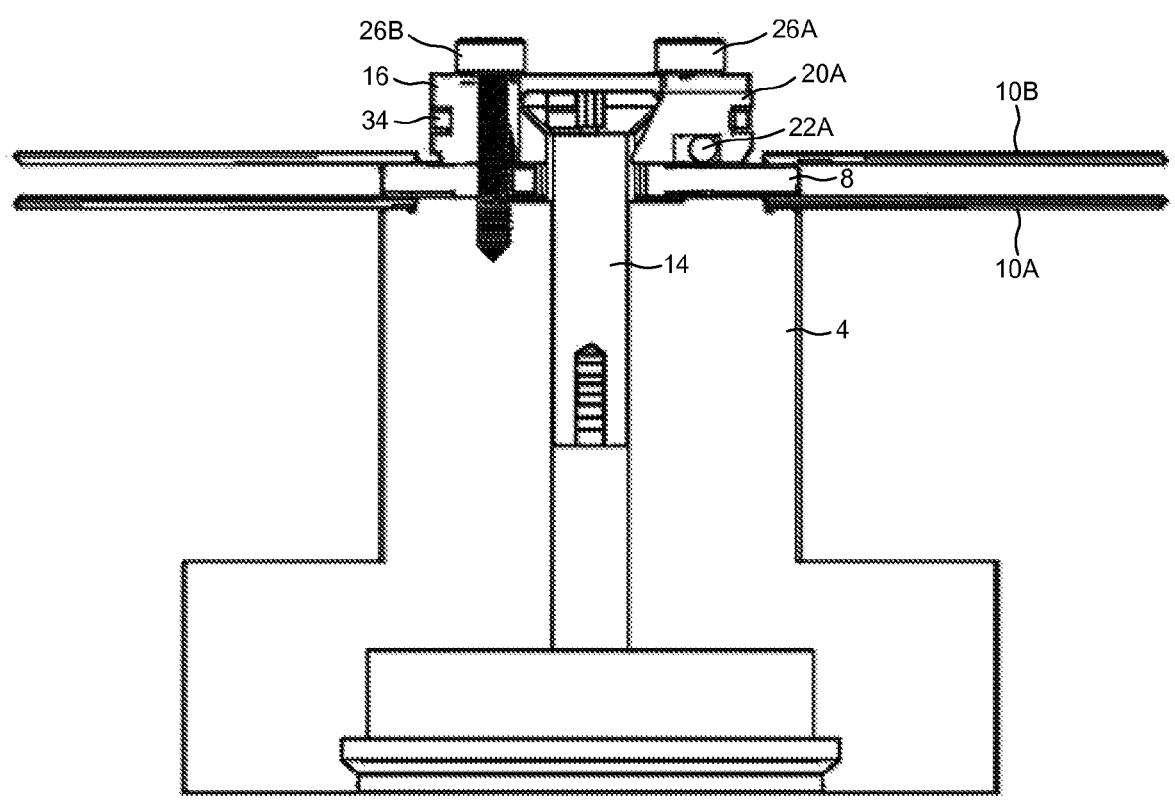
FIG. 4 shows a cross-section view of the spin stand with the second disk clamp in the unclamped position according to an embodiment of the present invention.

FIG. 4 is a cross sectional view of the spin stand according to an embodiment of the present invention showing the disk spacer 8 clamping the first disk 10A via screws 26A-26C compressing the housing 16 onto the disk spacer 8. The piston 14 is shown in the up position so that the second disk 10B is unclamped and the circular elastic band 34 biases the fingers 20A-20C away from the first disk 10B into their retracted position.

Figure 5A:
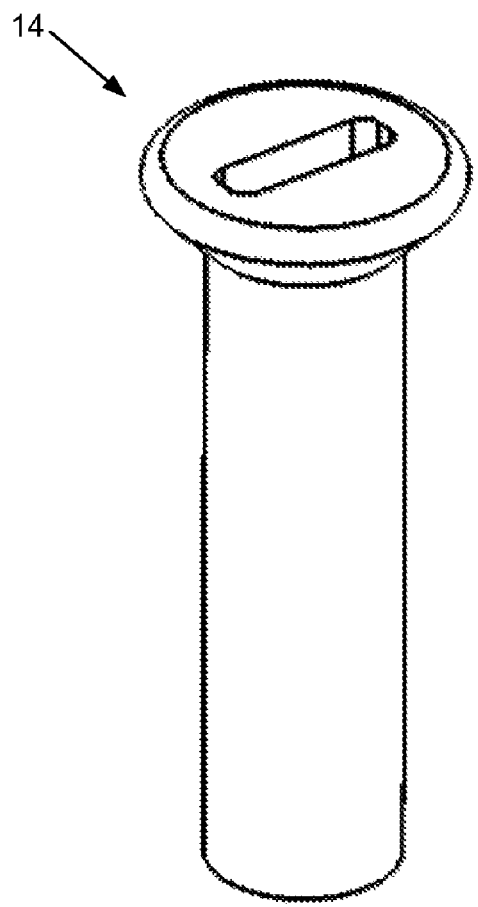
FIG. 5A shows a perspective view of a piston that is actuated vertically in order to clamp/unclamp the second disk according to an embodiment of the present invention.
Figure 5B:
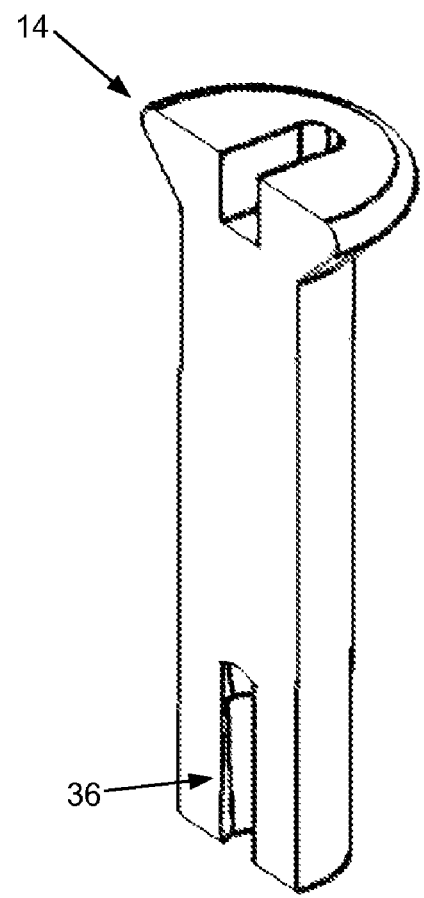
FIG. 5B shows a cross-section view of the piston including a threaded screw hole according to an embodiment of the present invention.

FIG. 5A shows a perspective view of the piston 14 and FIG. 5B shows a cross-section view of the piston 14. The piston 14 may be actuated in any suitable manner in order to clamp and unclamp the second disk clamp 12. In one embodiment, a threaded screw hole 36 is bored into the bottom of the piston 14 for receiving a screw (not shown), where the piston 14 may be actuated up and down by turning the screw. In another embodiment, a diaphragm (not shown) may be coupled to the piston 14 (e.g., using a screw inserted into the screw hole 36). The diaphragm chamber may be filled with air using a suitable pump in order to push the piston 14 into the up position (unclamped position), and then the air sucked out of the diaphragm chamber using a suitable vacuum in order to pull the piston into the down position (clamped position). Other embodiments may employ springs to bias the piston 14 either up or down, and a suitable pump or vacuum to move the piston 14 opposite the biasing force.

In yet another embodiment, the piston 14 may be moved into the clamped position using a suitable mechanical actuator (e.g., pump or vacuum), and then to unclamp the second disk 10B, the actuator is turned off so that the force of the circular elastic band 34 retracts the fingers 20A-20C causing the piston 14 to move up into the unclamped position. Other types of elastic members may be employed to retract the fingers 20A-20C such as a spring integrated within each chamber 18A-18C of the housing 16 (FIG. 3). In yet another embodiment, an end user may manually press the fingers 20A-20C back into their unclamped position (i.e., an elastic member such as the circular elastic band 34 of FIG. 3 may not be needed to retract the fingers 20A-20C).

Figure 6A:
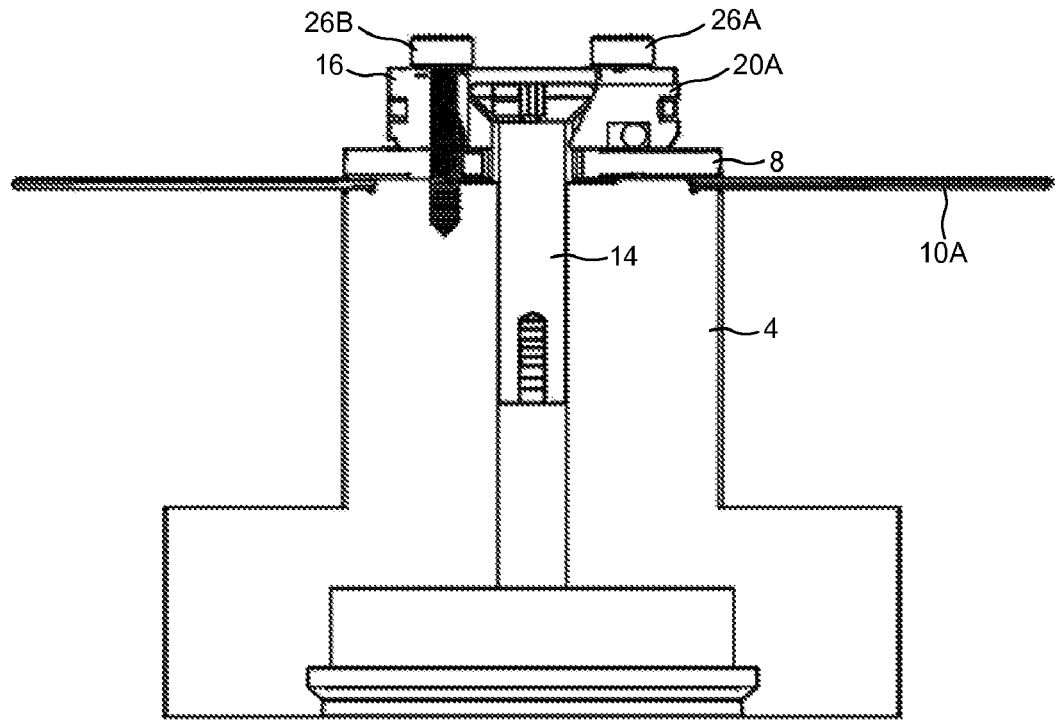
FIG. 6A is a cross-section view of the spin stand wherein the first disk has been clamped to the rotor and awaiting the second disk according to an embodiment of the present invention.
Figure 6B:
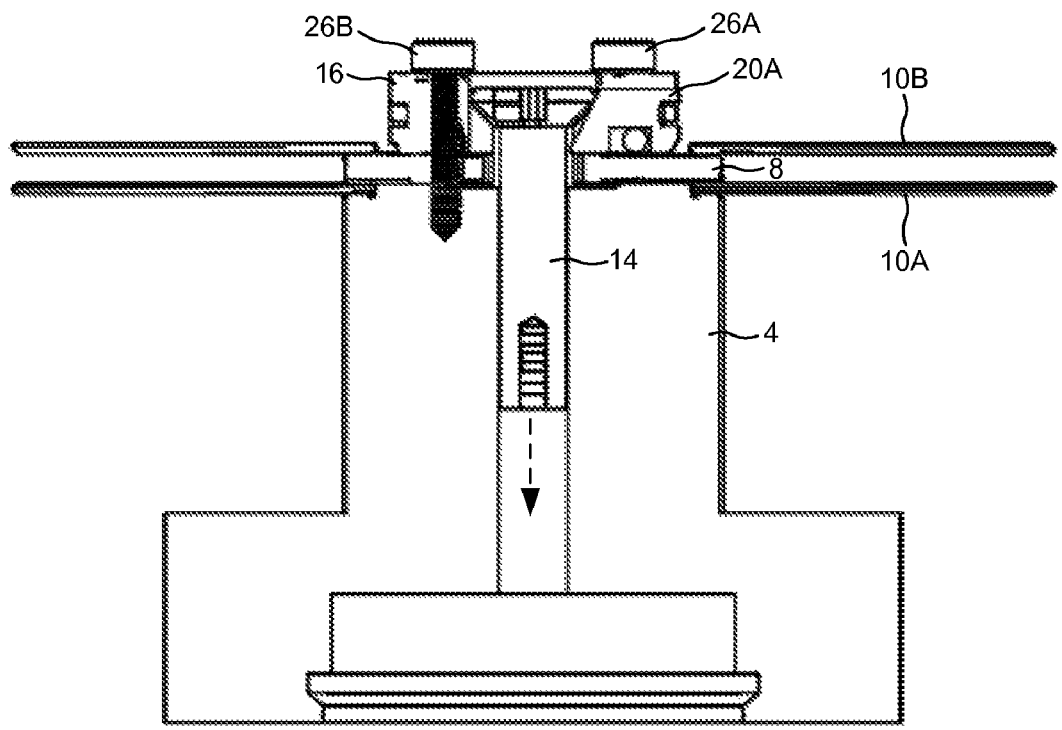
FIG. 6B is a cross-section view of the spin stand wherein the second disk has been placed over the disk spacer before being clamped to the rotor according to an embodiment of the present invention.
Figure 6C:
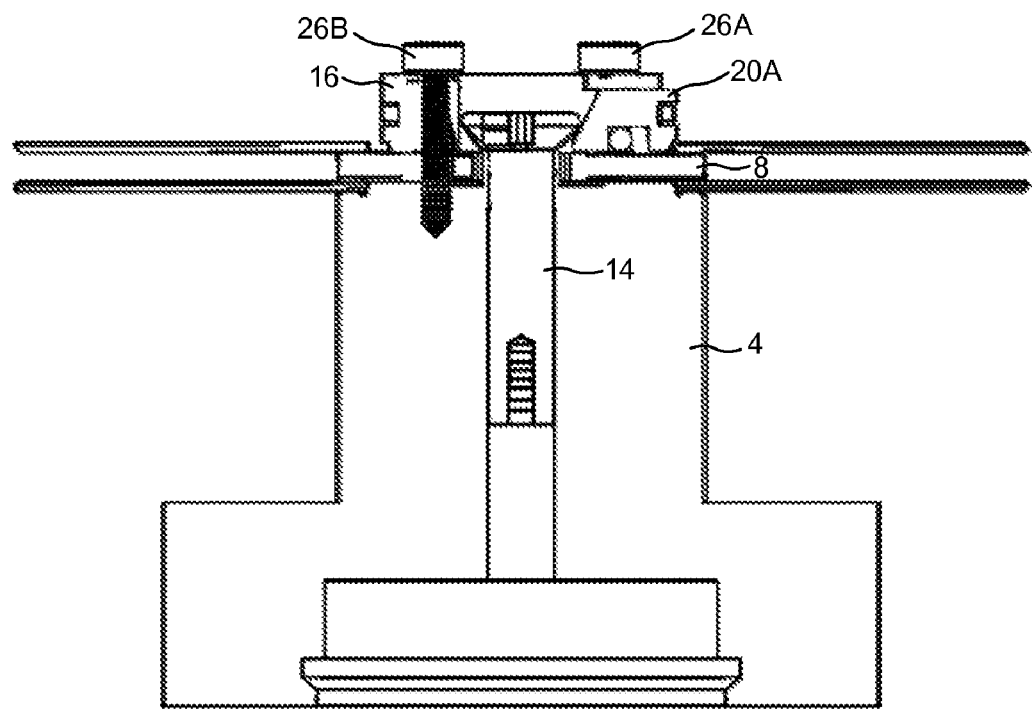
FIG. 6C is a cross-section view of the spin stand wherein the second disk has been clamped to the rotor by the second disk clamp according to an embodiment of the present invention.
Figure 6D:
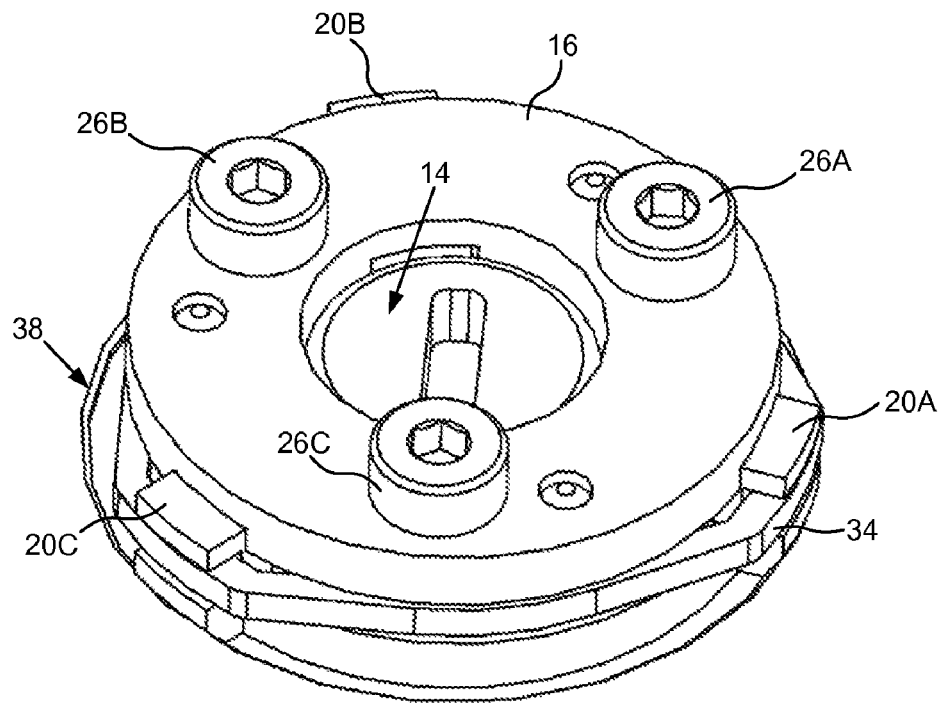
FIG. 6D shows a magnified view of the second disk clamp in the clamped position according to an embodiment of the present invention.

FIGS. 6A-6D illustrate operation of the spin stand according to an embodiment of the present invention, wherein FIG. 6A shows a first disk 10A clamped to the rotor 4 by a user manually tightening screws 26A-26C so that the housing 16 presses down on the spacer 8. A second disk 10B is placed over the top surface of the spacer 8 as shown in FIG. 6B and then the actuator energized to pull the piston 14 into the down position. FIG. 6C shows the piston 14 in the down position thereby extending the fingers (e.g., finger 20A) outward to engage an inner edge of the second disk 10B. FIG. 6D shows a magnified view of the second clamp in the clamped position, including piston 14 in the down position extending fingers 20A-20C outward to engage an inner edge 38 of the second disk 10B. To remove the second disk 10B from the spin stand, the piston 14 is moved to the up position so that the circular elastic band 34 retracts the fingers 20A-20C away from the inner edge 38 of the second disk 10B. The second disk 10B may then be removed from the spin stand and the process repeated in order to replace the second disk 10B with a third disk while the first disk 10A remains clamped to the rotor 4.

In one embodiment, servo data (e.g., concentric servo sectors or spiral tracks) may be written to the first disk surface 10A using any suitable technique. For example, the servo data may be written by the spin stand after clamping the first disk 10A to the rotor 4. In another embodiment, the servo data may be written to the first disk 10A before clamping it to the spin stand. The second disk 10B may then be clamped to the spin stand in order to perform any suitable operation facilitated by the servo data written on the first disk 10A. For example, the servo data on the first disk 10A may be read in order to servo the head(s) over the second disk 10B. Once the heads are at a target radial location, test data may be written to a surface of the second disk 10B. Any suitable test data may be written, such as servo data or a periodic pattern (e.g., a 2T pattern). The test data may then be read from the second disk 10B in order to perform any suitable operation, such as verifying the quality of the second disk 10B and/or the head(s). In yet another embodiment, various parameters may be calibrated (e.g., optimal write current, read bias current, radial and linear density, etc.) for a vendor specific head/disk combination. In one embodiment, the qualification, calibration, or other testing may require the second disk 10B be unclamped from the spin stand, heated in an oven, and then re-clamped to the spin stand for further testing. In other embodiments, the spin stand may be used to process the top disks in an assembly line fashion, such as serving on the first (bottom) disk 10A while servo writing the second (top) disk 10B (either full servo write or partial servo write of seed patterns). Accordingly, the dual disk clamp disclosed above in the embodiments of the present invention facilitates the clamping and unclamping of a second (top) disk 10B while a first (bottom) disk 10A remains clamped to the spin stand.

Although the foregoing has been described in terms of certain embodiments, other embodiments will be apparent to those of ordinary skill in the art from the disclosure herein. For example, the spacer 8 (FIG. 2) may be fastened to the rotor 4 using a different technique, such as with screws that only pass through the spacer 8 and not the housing 16 of the second disk clamp 12. In this embodiment, the top surface of the spacer 8 may comprise recesses for receiving the screw heads so that the second disk 10B lies flat on the top surface of the spacer 8. In the embodiments described above, the second disk clamp 12 comprises three fingers 20A-20C, whereas other embodiments may comprise a lesser or greater number of fingers. In yet another embodiment, the disk spacer 8 may be integrally formed with at least part of the second disk clamp 12 (e.g., using suitable injection molding plastic techniques). In yet other embodiments, the fingers 20A-20C may be connected to the housing 16 of the second disk clamp 12, such as fingers made from flexible plastic strips having a base connected to the housing 16. In this embodiment, the fingers themselves may exhibit an elasticity that biases the fingers away from the inner edge 38 of the second disk 10B while in the unclamped position (i.e., a separate biasing element such as the circular elastic band 34 of FIG. 3 may not be needed).

What is claimed is:

1. A spin stand comprising:
   a spindle motor comprising a rotor;
   a first disk clamp operable to clamp a first disk to the rotor;
   a second disk clamp operable to clamp a second disk to the rotor; and
   an actuator operable to clamp the second disk clamp in order to clamp the second disk to the rotor after the first disk has been clamped to the rotor, and without the actuator significantly increasing a clamping force to the first disk.

2. The spin stand as recited in claim 1, wherein the actuator is further operable to unclamp the second disk clamp while the first disk remains clamped to the rotor.

3. The spin stand as recited in claim 1, wherein the first disk clamp comprises a disk spacer for applying a clamping force to the first disk and for spacing the first disk from the second disk.

4. The spin stand as recited in claim 3, wherein the disk spacer applies the clamping force by tightening a screw.

5. The spin stand as recited in claim 3, wherein the disk spacer applies the clamping force to the first disk after the actuator unclamps the second disk clamp.

6. The spin stand as recited in claim 4, wherein the screw remains tightened after the actuator unclamps the second disk clamp.

7. The spin stand as recited in claim 1, wherein the actuator comprises a piston moved along a rotational axis of the first and second disks.

8. The spin stand as recited in claim 7, wherein: the second disk clamp comprises a plurality of fingers; to clamp the second disk clamp, the actuator is operable to move the piston in order to extend the plurality of fingers outward until the fingers engage an inner edge of the second disk; and to unclamp the second disk clamp, the actuator is operable to move the piston in order to retract the plurality of fingers away from the inner edge of the second disk.

9. The spin stand as recited in claim 8, wherein the actuator comprises an elastic member for biasing the plurality of fingers away from the inner edge of the second disk.

10. The spin stand as recited in claim 9, wherein the elastic member comprises a circular elastic band wrapped around the fingers.

* * * * *